(12) United States Patent
Mansur

(10) Patent No.: US 6,227,214 B1
(45) Date of Patent: May 8, 2001

(54) VAPOR CONTAINMENT AND RECOVERY SYSTEM ON A GENERAL PARTS WASHER APPARATUS

(75) Inventor: Pierre G. Mansur, Miami, FL (US)

(73) Assignee: Mansur Industries Inc., Miami, FL (US)

( * ) Notice: Subject to any disclaimer, the term of this patent is extended or adjusted under 35 U.S.C. 154(b) by 0 days.

(21) Appl. No.: 09/165,471

(22) Filed: Oct. 2, 1998

(51) Int. Cl.[7] .................................................. B08B 3/10
(52) U.S. Cl. ...................... 134/107; 134/105; 134/111; 134/104.1
(58) Field of Search ................................. 134/105, 108, 134/107, 104.1, 200, 111; 68/18 C, 18 F

(56) References Cited

U.S. PATENT DOCUMENTS

| | | | |
|---|---|---|---|
| 3,998,738 | * 12/1976 | Kusay | 134/111 |
| 4,025,363 | * 5/1977 | Desantis | 134/111 |
| 4,029,517 | * 6/1977 | Rand | 134/105 |
| 4,101,340 | * 7/1978 | Rand | 134/105 |
| 4,483,160 | * 11/1984 | Jost | 68/18 C |
| 4,513,590 | * 4/1985 | Fine | 68/18 C |
| 4,676,261 | * 6/1987 | Blual | 134/111 |
| 4,881,561 | * 11/1989 | Schwarzwalder | 134/111 |
| 5,240,018 | * 8/1993 | Clark et al. | 134/105 |

FOREIGN PATENT DOCUMENTS

| | | | |
|---|---|---|---|
| 1351302 | * 4/1974 | (GB) | 68/18 C |
| 565727 | * 7/1977 | (SU) | 134/108 |
| 707994 | * 1/1980 | (SU) | 134/108 |

* cited by examiner

Primary Examiner—Frankie L. Stinson
(74) Attorney, Agent, or Firm—Robert M. Downey, P.A.

(57) ABSTRACT

A system and method for containment and recovery of vapors in a general parts washer apparatus, wherein a solvent is delivered to a wash area for washing articles therein; the system including a unit supported in air flow communication with the wash area and having a fan for drawing solvent vapors in a flow of air from within the wash area and through the unit. Activated carbon filters within the unit separate moisture from the air flow to trap solvent within a separation chamber. During a distillation cycle, a vacuum activated valve assembly closes the separation chamber and a heater raises the temperature within the separation chamber, under negative pressure, causing liquid solvent in the chamber to vaporize. The solvent vapors are removed from the separation chamber and converted to pure liquid solvent in a condenser. The pure liquid solvent is thereafter directed to a clean solvent holding tank in the parts washer apparatus.

8 Claims, 1 Drawing Sheet

VAPOR CONTAINMENT AND RECOVERY SYSTEM ON A GENERAL PARTS WASHER APPARATUS

BACKGROUND OF THE INVENTION

1. Field of the Invention

The present invention relates to industrial washing equipment, and more specifically, to a system for containing vapors and recovering liquid solvent from the vapors in a general parts washer apparatus, wherein a solvent is used to clean various articles in a wash basin, sink or like wash area.

2. Description of the Related Art

Liquid solvents are used in many industries throughout the world to clean a variety of articles including engine parts, machine parts, paint spraying equipment, and the like. Often, solvents are used in industrial washing equipment and, particularly, in general parts washers of the type having a sink, basin or like washing area which is normally enclosed by a hood or cover when not in use.

Presently, there are nearly two million parts washing machines used daily in the United States. Many of these machines are provided with a sink or wash basin into which a liquid solvent is released from a spigot or hose in order to wash various articles therein. In the normal parts washing process, liquid solvent is sprayed onto the surfaces of the sink or wash area. Thereafter, the solvent quickly evaporates from the sink surfaces and enters the surrounding atmosphere. In fact, it is estimated that the use of solvents in parts cleaning operations throughout the U.S. results in thousands, and possibly millions of gallons of solvent being lost per year due to evaporation.

Accordingly, there is an urgent need in the industrial parts cleaning industry for a system and method which is specifically adapted to contain vapors within industrial washing equipment and to recover solvent from the vapors for subsequent use.

SUMMARY OF THE INVENTION

The present invention is directed to a system and method for containment and recovery of vapors in a general parts washer apparatus of the type wherein a solvent is delivered to a wash area for use during parts washing operations. The system includes a unit supported in communication with the wash area, with a fan for creating an air flow therethrough. In operation, the fan draws air containing solvent vapors from the wash area and through a separation chamber in the unit. Activated carbon filters within the unit separate moisture from the air flow to trap solvent within the separation chamber. During a distillation cycle, a vacuum activated valve assembly closes the separation chamber and a heater raises the temperature therein, under negative pressure, causing liquid solvent in the separation chamber to vaporize. From the condenser, the pure liquid solvent is directed to a clean solvent holding tank in the parts washer apparatus so that it can be used during subsequent washing operations.

OBJECTS AND ADVANTAGES OF THE INVENTION

It is a primary object of the present invention to provide a system and method for containing vapors within a parts washer apparatus and to recover solvent from the contained vapors so that the recovered solvent can be reused during future parts washing operations.

It is still a further object of the present invention to provide a system and method for containing vapors and recovering solvent from the vapors in a general washer apparatus wherein the recovered solvent is purified and free of contaminants for subsequent use in the apparatus.

It is still a further object of the present invention to provide a system and method which will substantially reduce the level of VOC emissions which result from the use of solvents in industrial washing equipment.

It is still a further object of the present invention to provide a system and method for containing vapors and recovering solvent from the vapors in a parts washer apparatus, wherein the system is adapted to be installed on existing and newly manufactured parts washing equipment in the industry.

It is yet a further object of the present invention to provide a system and method for containing vapors and recovering solvent from the vapors in industrial washing equipment, as set forth above, wherein the system can be economically integrated for use on existing equipment as well as newly manufactured equipment.

These and other objects and advantages of the present invention will be more readily apparent with reference to the detailed description and drawings.

BRIEF DESCRIPTION OF THE DRAWINGS

For a fuller understanding of the nature of the present invention, reference should be had to the following detailed description taken in connection with the accompanying drawings in which.

DETAILED DESCRIPTION OF THE PREFERRED EMBODIMENT

Figure 1:
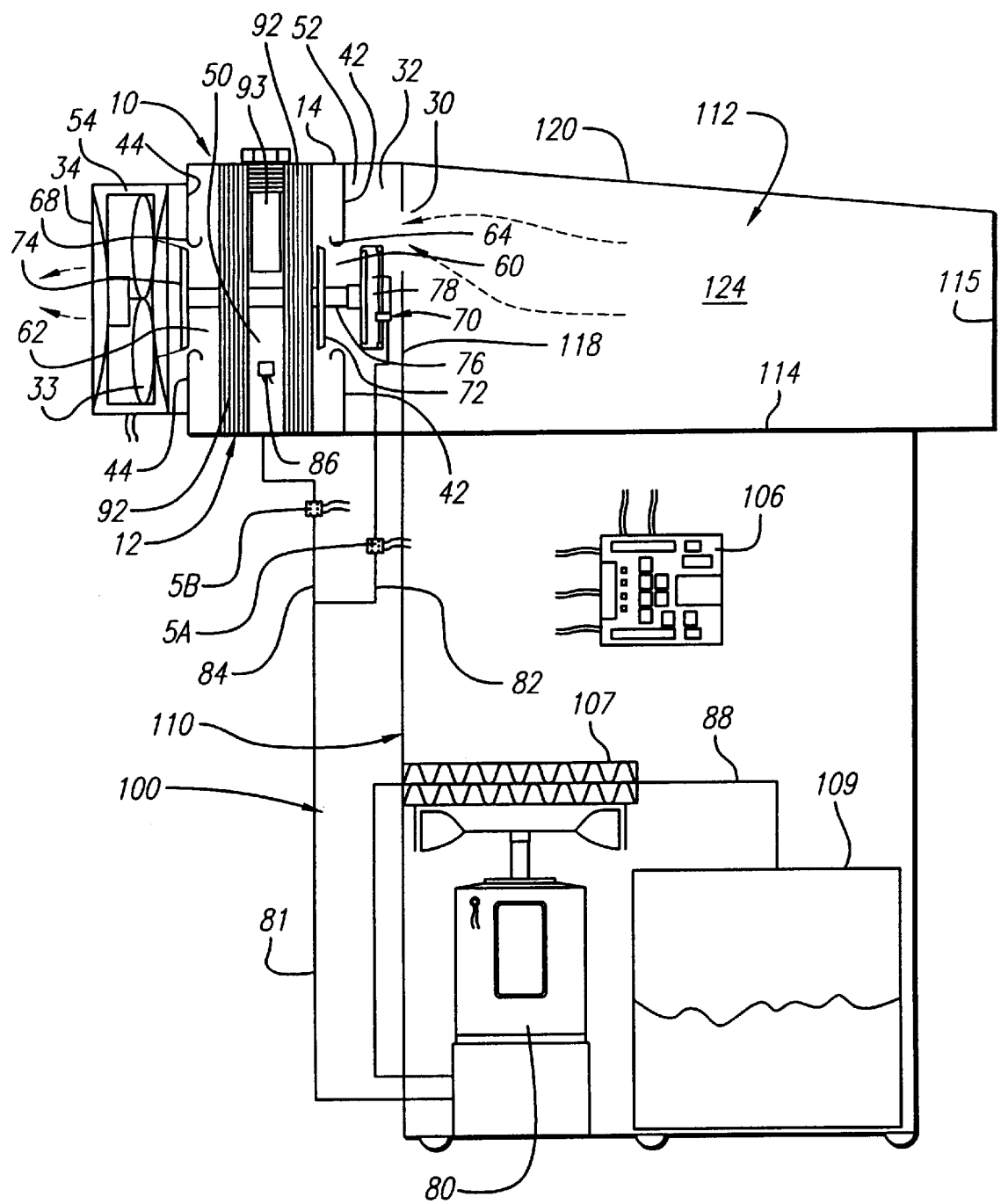
FIG. 1 is a side elevation, in cross section, illustrating the components of the system of the present invention installed on a general parts washer apparatus.

Referring to FIG. 1, the vapor containment and solvent recovery system of the present invention, generally indicated as 10, is shown installed on a general parts washer apparatus 100. The general parts washer apparatus 100 is of the type including a lower housing portion 110 and an upper sink 112 having a floor 114, a front wall 115, opposite side walls (not shown), and a rear wall 118. The sink is further provided with a hood 120 which is normally in a closed position, as seen in FIG. 1, when the apparatus 100 is not in use, thereby enclosing a wash area 124 within the sink.

The solvent recovery system 10 includes a unit 12 having a housing 14 which is structured and configured for attachment to one of the walls of the sink 112 of the parts washer 100. While the unit 12 could be attached to any of the walls of the sink 112, FIG. 1 shows the unit 12 fitted to the rear wall 118 of the sink. One or more through holes or air passage openings 30 are provided through the wall 118 of the apparatus 100 providing air flow communication between the wash area 124 and an interior 32 of the unit 12, as indicated by the arrows in FIG. 1. A fan 33 within a rear portion of the unit 12 generates an air flow through the interior 32 of the unit 12 by drawing air from within the wash area 124, through the air passage 30, and through the unit 12, forcing the air out through the opposite end 34 of the unit and into the surrounding atmosphere. In a preferred embodiment, the fan is an electric motor-driven exhaust fan and may include any of various types and models which are commercially available.

Interior wall sections 42, 44 divide a separation chamber 50 from a forward chamber 52 and a rear fan chamber 54. Openings 60, 62 through the wall sections 42, 44, respectively, are surrounded by valve seats 64, 68. A vacuum activated valve assembly 70 includes valve heads 72, 74 disposed in spaced relation from one another a movable shaft 76. The valve heads 72, 74 are structured and disposed for seating engagement with the respective valve seats 64, 68. In an open position, the valve heads 72, 74 are urged outwardly by shaft 76 in response to air pressure within actuation chamber 78, causing the valve heads to move away from the valve seats. In the open position, air can flow from the wash area 124 through the separation chamber 50 and the fan chamber 54, and out of the unit 12. When vacuum pressure is applied within the actuation chamber 78, the shaft 76 is pulled inwardly to cause the valve heads 72, 74 to mate with the valve seats, thereby closing off the separation chamber 50, rendering it substantially air tight.

During normal operation, the fan 33 draws air flow from within the wash area 124 and through the unit 12. The air drawn from the wash area 124 will normally contain solvent vapors. As the solvent vapors, in the air flow, pass through the separation chamber 50, activated carbon filters 92 separate the vapors from the air flow, causing the solvent to be trapped in the filters. Clean air is exhausted through the fan housing 54 to atmosphere. During continued operation of the fan 33, with the valve assembly 70 open, solvent accumulates in the filters 92.

During a distillation cycle, the valve assembly 70 is closed to seal off the separation chamber 50. Specifically, a vacuum pump 80 interconnects to the valve assembly 70 and the separation chamber 50 via vacuum line 81 and branch lines 82, 84. During the distillation cycle, valve 5A in the vacuum line 82 is opened, creating negative pressure in the actuation chamber 78 of the valve assembly 70, via the connection of vacuum line 82, while valve 5B is closed. Once valve assembly 70 is closed, valve 5A closes to keep negative pressure in actuation chamber 78, thereby holding valve assembly 70 in the closed condition. Further, a negative pressure condition is created within the separation chamber 50 via the interconnection of vacuum line 84, as the vacuum pump 80 continues to draw vacuum through the vacuum line 81, after opening of valve 5B.

A heater element 93 within the separation chamber 50 raises the temperature within the chamber to cause the liquid solvent trapped in the filters to vaporize. A temperature switch 86 monitors temperature and controls the heater element 93, causing the heater element to be deactivated when a predetermined temperature level is reached in the separation chamber 50. The solvent vapor in the chamber 50 is drawn through the vacuum line 84 and main vacuum line 81 and is directed to condenser/cooler unit 107. The solvent vapor is condensed in the condenser 107 to yield purified, liquid solvent which is directed through return line 88 to the solvent holding tank 109. The clean solvent collected in the holding tank 109 is used during future parts washing operations in the apparatus 100.

Upon completion of the distillation cycle, the vacuum pump 80 is deactivated and valve 5A is opened to release vacuum in the valve actuation chamber 78, thereby causing the valve assembly 70 to open. Thereafter, valve 5B is closed.

The electronic components of the system 10 and the parts washer apparatus 100 are wired to electronic control panel 106 for selective control and activation thereof throughout the various operational cycles of the parts washer apparatus 100 and solvent recovery system 10.

While the instant invention has been shown and described in what is considered to be preferred and practical embodiments thereof, it is recognized that departures may be made from the instant disclosure which, therefore, should not be limited except within the spirit and scope of the present invention.

What is claimed is:

1. An assembly for use on a parts washer apparatus having a cleaning solution holding tank and a wash area, wherein vapors are released from a cleaning solution used to wash articles in the wash area, said assembly comprising:

a separation chamber;

means for creating a stream of air flow from the wash area and into said separation chamber to force the vapors from the wash area directly into said separation chamber;

filter means disposed in confronting relation to said stream of air flow within said separation chamber for entrapping and holding droplets of the cleaning solution contained in the vapors as said vapors are forced with said stream of air flow through said separation chamber and said filter means;

means for removing the cleaning solution droplets from said filter means and including heating means in said separation chamber for raising the temperature within said separation chamber so as to cause the cleaning solution droplets entrapped by said filter means to vaporize within said separation chamber;

means for transferring the removed cleaning solution droplets from said separation chamber to the cleaning solution holding tank and including vacuum means for creating a negative pressure condition between said condenser means and said separation chamber to thereby transfer said vapors from said separation chamber to said condenser means.

2. The assembly as recited in claim 1 wherein said assembly includes a housing supported on the parts washer apparatus and including said separation chamber therein, said housing including openings for allowing air flow and vapors from the wash area to flow into said separation chamber.

3. The assembly as recited in claim 2 further including valve means for closing said openings of said housing, said valve means being structured and disposed for sealing closed said separation chamber in air-tight relation to an exterior thereof.

4. The assembly as recited in claim 3 further including condenser means for condensing the vaporized cleaning solution to yield clean, non-contaminated cleaning solution.

5. The assembly as recited in claim 4 wherein said means for creating an air flow includes a fan within said housing.

6. The assembly as recited in claim 4 wherein said means for transferring further includes at least one conduit extending between said separation chamber and the holding tank, said at least one conduit extending through said condenser means.

7. The assembly as recited in claim 1 wherein said filter means includes at least one activated carbon filter positioned and disposed in confronting relation to said air flow.

8. An assembly for use on a parts washer apparatus having a cleaning solution holding tank and a wash area, wherein vapors are released from a cleaning solution during use of the cleaning solution to wash articles in the wash area;

said assembly comprising:
   a housing including a separation chamber therein;
   means for forcibly directing the vapors along an air stream from the wash area and through the separation chamber;
   means disposed in confronting relation to the air stream for separating droplets of the liquid cleaning solution from the vapors traveling with the air stream;
   means for periodically closing the separation chamber;
   heating means for boiling said separated droplets of the liquid cleaning solution to produce vapors in the closed separation chamber and causing contaminant substances to be separated from the cleaning solution;
   condenser means for condensing the vapors from the boiled liquid cleaning solution to produce clean non-contaminated liquid cleaning solution;
   vacuum means for creating a negative pressure condition between said condenser means and said separation chamber for transferring the produced vapors from said separation chamber to said condenser means; and
   means for transferring the clean, non-contaminated liquid cleaning solution to the holding tank of the parts washer apparatus.

\* \* \* \* \*